United States Patent [19]

Motomura et al.

[11] Patent Number: 5,305,458
[45] Date of Patent: Apr. 19, 1994

[54] MULTIPLE VIRTUAL STORAGE SYSTEM AND ADDRESS CONTROL APPARATUS HAVING A DESIGNATION TABLE HOLDING DEVICE AND TRANSLATION BUFFER

[75] Inventors: Yukihiro Motomura; Hideki Takeuchi; Hideo Sawamoto, all of Hadano; Mari Ara, Yamato, all of Japan

[73] Assignee: Hitachi, Ltd., Tokyo, Japan

[21] Appl. No.: 518,411

[22] Filed: May 2, 1990

[30] Foreign Application Priority Data

May 2, 1989 [JP] Japan .................. 1-112967

[51] Int. Cl.$^5$ ............................................ G06F 12/00
[52] U.S. Cl. ...................... 395/725; 395/375; 395/425; 395/800; 364/DIG. 1; 364/228.2; 364/254.3; 364/255.7; 364/256.3; 364/256.4; 364/256.5
[58] Field of Search ........... 395/400, 425, 375, 725, 395/800, 325, 425

[56] References Cited

U.S. PATENT DOCUMENTS

| | | | |
|---|---|---|---|
| 4,355,355 | 10/1982 | Butwell et al. | 364/200 |
| 4,481,573 | 11/1984 | Fukunaga et al. | 364/200 |
| 4,500,952 | 2/1985 | Heller et al. | 395/400 |
| 4,979,098 | 12/1990 | Baum et al. | 395/400 |
| 5,008,811 | 4/1991 | Scalzi et al. | 364/200 |
| 5,134,696 | 7/1992 | Brown et al. | 395/700 |

FOREIGN PATENT DOCUMENTS 56-140576 5/1989 Japan .

Primary Examiner—Alyssa H. Bowler
Assistant Examiner—Mehmet Geckil
Attorney, Agent, or Firm—Antonelli, Terry, Stout & Kraus

[57] ABSTRACT

In a multiple virtual storage system and more particularly in an address control apparatus, there are provided two kinds of holding devices a designation holding device for holding a segment table designations in association with access registers and a translation buffer for holding translation pairs of the access register and segment table designation. With this arrangement, the segment table designation designating the virtual address space possessing an operand of an instruction can be supplied quickly and efficiently.

2 Claims, 2 Drawing Sheets

MULTIPLE VIRTUAL STORAGE SYSTEM AND ADDRESS CONTROL APPARATUS HAVING A DESIGNATION TABLE HOLDING DEVICE AND TRANSLATION BUFFER

BACKGROUND OF THE INVENTION

1. Field of the Invention

This invention relates to a multiple virtual storage system, and more particularly to an address control apparatus for providing a segment table designation needed when a program being executed accesses a plurality of virtual address spaces concurrently, at high speed with good efficiency.

2. Description of the Related Art

Heretofore, in multiple virtual storage systems, a virtual address space possessing an instruction to be executed and the associated operand is determined according to segment and page tables located on a main storage, and each virtual address space is referred to by a pointer which is called a segment table designation (STD) positioning the segment table located on the main storage. This STD is prestored in a predetermined control register in a processor.

The technical concept that a program being executed performs concurrent accessing to a plurality of address spaces is exemplified by Japanese Patent Laid-Open Publication No. 140576/1981. According to this prior concept, access registers (ARs) related to general registers (GRs) are located in a processor, and the STD directly designating a virtual address space possessing an operand is stored in each of the ARs. Using the STD in the AR related to the GR to be used as a base register during the operand access, a virtual address space of the operand is designated so that a program being executed can access a plurality of address spaces concurrently.

This prior art merely discloses the ARs directly storing the STD but is totally silent about any address control system in which the content of an AR indirectly designates an STD.

Specifically, the STD which designates a virtual address space accessible from an instruction being executed is prepared on a main storage as a table by a system program. And a leading address of the table as well as an address in the table, which are given from the system program, are held in a control register (CR) and an AR, respectively. With the system in which the CR and AR designate the STD indirectly, the STD cannot be obtained until the contents of the CR and AR are added at every operand access whereupon reference must be made, with the resulting address, to the table on the main storage. As a consequence, its overhead would increase to lower the processing performance The more complex the translating process before making reference to the table storing the STDs, the further the processing performance is lowered.

SUMMARY OF THE INVENTION

It is therefore an object of this invention to provide a multiple virtual storage system and an address control apparatus which can reduce overhead due to the translating process for obtaining an STD from an AR when the STD is to be designated indirectly from the content of the AR.

According to a first aspect of this invention, there is provided a multiple virtual storage system which includes in a processor a plurality of general registers and a plurality of access registers corresponding to the general registers and in which when any one of the general registers is designated by an instruction being executed, a logical address of operand of the instruction is obtained by using the content of the designated general register while designating a virtual address space possessing the operand by a segment table designation obtained by translating the content of the access register corresponding to the designated general register according to a predetermined rule with a table in a main storage and in which the segment table designation and the logical address are translated into a real address by an address translator. The multiple virtual storage system comprises an access register translating means for translating the content of the access register to obtain the segment table designation; and a designation holding means for holding the segment table designation obtained by the access register translating means and valid bits each indicating whether the respective segment table designation is valid or not, in association with the general registers. At the time of an operand access attendant on executing an instruction, the system reads the content of the designation holding means corresponding to the general register, in parallel with reading the general register for calculating an address of the operand, supplies the segment table designation, along with the logical address, to the address translator if the read segment table designation is valid, and if the read segment table designation is invalid, performs the translating of the access register while deterring the execution of the instruction so that the segment table designation obtained by the translating is stored in the designation holding means to restart executing an instruction.

According to a second aspect of the invention, there is provided a multiple virtual storage system which includes in a processor a plurality of general registers and a plurality of access registers relating to the general registers and in which when any one of the general registers and the respective one of access registers are designated by an instruction being executed, a logical address of operand of the instruction is obtained by using the content of the designated general register while designating a virtual address space possessing the operand by a segment table designation obtained by translating the content of the access register according to a predetermined rule with a table in a main storage and in which the segment table designation and the logical address are translated into a real address by an address translator. The multiple virtual storage system comprises an access register translating means for translating the content of the access register to obtain the segment table designation; a designation holding means for holding segment table designations obtained by the access register translating means and valid bits each indicating whether the respective segment table designation is valid or not, in association with the general register; and a translation buffer for holding a plurality of translation pairs of data translated in the past through the access register translation and the translated result. At the time of an operand access attendant on executing an instruction, the system reads the content of the designation holding means corresponding to the general register, in parallel with reading the general register for calculating an address of the operand, supplies the segment table designation, along with the logical address, to the address translator if the read segment table designation is valid, deters the execution of the instruction if the read segment table designation is invalid, discriminates, with comparison between the translated data held by the translation buffer and the data to be translated at the current operand access, whether or not the access register translation was performed in the past on the data to be translated, restarts executing the instruction, if the access register translation was performed, after storing in the designation holding means the segment table designation held by the buffer and supplying the segment table designation to the address translator, and if the access register translation was not performed in the past, performs the access register translation so that the segment table designation obtained by the translating is stored in the designation holding means and the translation buffer to restart executing an instruction.

According to a third aspect of the invention, there is provided an address control apparatus in a multiple virtual storage system in which one of a plurality virtual address spaces possessing an operand of an instruction being executed is designated by referring to a segment table which defines one of the virtual address spaces in relation with a respective one of general registers designated by the instruction being executed. The address control apparatus comprises a plurality of access registers, corresponding to the general registers in a processor, for storing data available to designate one of the virtual address spaces to be accessed; an access register translating means responsive to the data stored in one of the access registers for obtaining a segment table designation which designates the segment table; a designation holding means for holding the segment table designation obtained by the access register translating means, in association with the general register corresponding to the one of the access registers; a logical address computing means for obtaining a logical address of operand of the instruction based on the content of the general register designated by the instruction being executed; a reference means for referring to the content of the designation holding means in correspondence with the general register designated by the instruction; and an address translator for obtaining a real address of the operand based on the segment table designation referred to by the reference means and the logical address obtained by the logical address computing means.

According to a fourth aspect of the invention, there is provided an address control apparatus in a multiple virtual storage system in which a segment table designation designating a segment table for defining a virtual address space is obtained by performing a predetermined translation on the content of an access register relating to a general register. The address control apparatus comprises an access register translating means for obtaining the segment table designation by performing the predetermined translation on the content of the access register; a designation holding means for holding, in correspondence with the general register, the segment table designation obtained by the access register translating means; and a translation buffer for holding a plurality of translation pairs of data translated in the past by the access register translating means and the segment table designation as the translated result.

Preferably, in each of the above-named address control apparatuses, the designation holding means may be capable of holding, in addition to the segment table designation, a valid bit indicating whether the segment table designation is valid or not.

Referring to and registering of the translation buffer may preferably be performed under the control of a microprogram built in a processor.

The translation buffer may be provided in a work storage dedicated to hardware and located in a processor. The translation buffer may also be provided in a field dedicated to hardware and located on a main storage, the field being accessible from hardware and inaccessible from a program being executed. Alternatively, the translation buffer may be provided partly in a first work storage dedicated to hardware and located in a processor and partly in a second storage dedicated to hardware and located in a main storage, the second storage being accessible from hardware and inaccessible from a program being executed.

In the address control apparatus in which the designation holding means has a valid bit, when the content of an access register is reloaded, the valid bit of the corresponding segment table designation in the designation holding means is turned to "invalid", and when the segment table obtained by the translating means based on the content of the reloaded access register is stored in the designation holding means, the valid bit is regarded as "valid".

The designation holding means is equipped with, in accordance with the general registers (i.e., in accordance with the access registers), the segment table designations obtained by giving predetermined translations of the contents of the access resistors. With this arrangement it is possible to obtain a target virtual address space, without interrupting the execution of an instruction, by reading out a segment table designation in the designation holding means in parallel with reading out a general register during the decoding of the instruction. This predetermined translation is to translate the content of the access register (AR) according to a predetermined rule with tables in the main storage and is accordingly called an AR translation.

The STD, in one of the AR-STD registers (ASRs) constituting the designation holding means and designated by the base field of an instruction, is read out of the ASR in accessing an operand, in parallel with reading out the general register (GR) designated by the base field. If the STD is valid, it is possible to access a virtual space, without reducing the performance, by supplying that STD to the dynamic address translator (DAT). If the STD read from the ASR is invalid, reference is made to the translation buffer (ALB). If the AR translation was performed in the past with the content of the AR, the corresponding STD in the ALB is supplied to the DAT; and if the AR translation was not performed in the past, the AR translation is performed to obtain the STD, which is then supplied to the DAT. Accordingly it is possible to minimize the interrupt of execution of the instruction.

As discussed above, it is possible to minimize the occurrences of the AR translation by making reference to the two-step STD holding means in which instead of performing the AR translation for each operand access, reference is made firstly to the ASR, and if the ASR is invalid, reference is made secondly to the ALB.

The above and other advantages, features and additional objects of this invention will be manifest to those versed in the art upon making reference to the following detailed description and the accompanying drawings in which a preferred embodiment incorporating the principles of this invention is shown by way of illustrative example.

DETAILED DESCRIPTION

Figure 1:
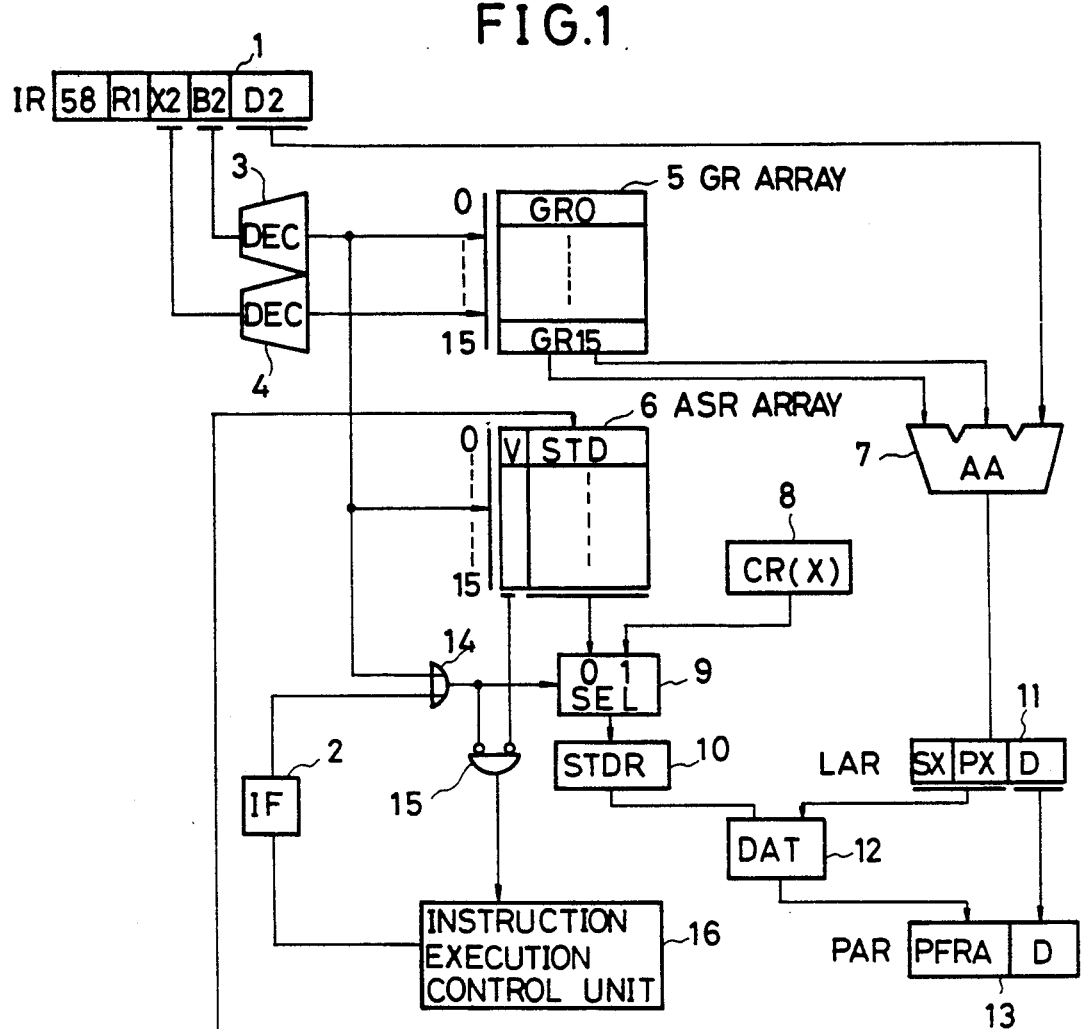
FIG. 1 is a block diagram showing a multiple virtual storage system and an address control apparatus according to an embodiment of this invention.
Figure 1:
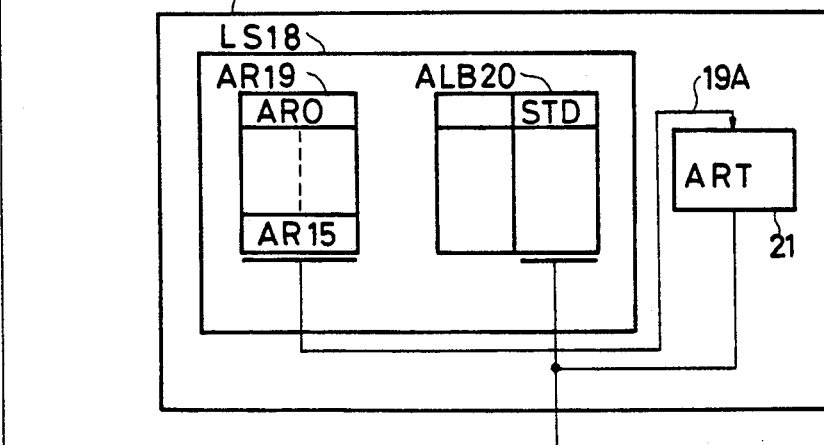

FIG. 1 is a block diagram showing an address control circuit embodying this invention. In FIG. 1, an instruction register 1 is a register for storing an instruction to be executed. Only a load instruction is described here for clarity. The load instruction is composed of an instruction code "58", a first operand address R1 an index field X2, a base field B2 and an in-page address or displacement D2. The load instruction is to store in a GR designated by the R1 field, a second operand as data in a main storage which is designated by a second operand address obtained by adding the in-page address with the contents of the GRs designated by the X2 and the B2 fields.

The X2 field and the B2 field in this instruction register 1 are supplied to GR decoders 3 and 4, respectively. The GR decoders 3 and 4 select, from GR0 to GR15 of a GR array 5, GRs designated by the X2 field and the B2 field, respectively, and supply the contents of the selected GRs to an address adder (AA) 7. The address adder 7 adds the contents of the GRs supplied from the GR array 5 and the D2 field in the instruction register 1, and supplies the result, as the second operand address, to a logical address register (LAR) 11.

In parallel with this, the output of the GR decoder 3, which decodes the B2 field, is also supplied to an ASR array 6. In the ASR array 6, the STD obtained by translating the content of each of AR0 to AR15 according to a predetermined rule with tables in the main storage, and the valid bit V indicating whether this STD is valid or not, are held in association with AR0 to AR15. The ASR array 6 outputs V and STD in the entry designated by the B2 field.

The STD outputted from the ASR 6 is supplied to an STD selector 9. The STD selector 9 is capable of selecting one of a primary STD held in a control register 8 and an STD supplied from the ASR array 6. When an OR gate 14 is biased, the STD selector 9 chooses the control register 8. The OR gate 14 is biased either when an instruction fetch trigger 2 to be set during the reading of an instruction, or when the base field designates "0".

The STD selected by the STD selector 9 is set to an STD register 10 and is transferred to a dynamic address translator (DAT) 12 including a known translation lookaside buffer (TLB). The dynamic address translator 12 outputs a page frame real address PFRA, via the TLB or the address translation process, based on the STD register 10 along with a segment index SX and a page index PX in the logical address register 11. The thus obtained page frame real address PFRA and an in-page address D of the logical address register 11 are set, as a read address, in a read address register 13. Since the TLB and the address translation process in the dynamic address translator 12 are known in the art and are not pertinent in this invention, their description is omitted here for clarity.

The V bit in the ASR array 6 is a bit to indicate whether the STD in the entry is valid or not; when the bit is "0", it indicates that the STD in the entry is not usable. At initialization of the apparatus or when the AR and the STD in the ASR entry come out of agreement with each other as the AR is reloaded due to the necessity to modify the allocation of the base field to the virtual address space, the V bit writes "0" to invalidate the corresponding STD in the ASR entry. As mentioned above, at the time of operand access, the V bit is read from the ASR array in parallel with reading the GR. When the V bit thus read out is "0" and the request is not one which uses the primary STD in the control register 8, an AND gate 15 is biased to transfer to an instruction execution control unit 16 a signal for notifying that the STD of the ASR entry is invalid. The instruction execution control unit 16 inhibits the execution of an instruction, upon receipt of this signal, to start a microprogram.

The microprogram refers to an AR translation buffer (ALB) 20 disposed in a local storage (LS) 18 in a microprogram control circuit 17 controllable from the microprogram. This ALB 20 has a feature like the TLB in the dynamic address translator. The ALB 20 holds (described below in connection with FIG. 3), in the form of translation pairs, data to be translated, such as the contents of the AR and control register during the AR translation performed in the past, and the STD obtained as the result of the AR translation. With reference to this ALB, the microprogram compares current data to be translated such as contents of the AR and control register with the ALB entry. If there exists any associated STD translated in the past, the microprogram reads such STD from the ALB to write as the STD in the ASR array 6. At the same time, the microprogram writes "1" also in the V bit in the ASR array to validate the ASR entry so that the inhibited execution of the instruction is restarted.

However, if there exists no associated STD in the ALB in referring to the ALB, the AR translation is performed by an AR translator (ART) 21 in the microprogram control circuit 17 to obtain the STD. The ART 21 writes this STD in the ALB and the ASR array 6 and then restarts the inhibited execution of the instruction.

Given as mentioned above that the result of the AR translation is held in the two-hierarchical STD holding means including the ASR array 6 and the ALB, it is possible to supply the STD at high speed.

Further, since the STDs corresponding to the current ARs are held in the ASR array 6, it is necessary to read only the STD of the ASR entry designated by the base field, during the operand access, requiring no reference to the ALB. The ALB is not referred to until the AR and the STD in the ASR entry come out of agreement with each other as the content of the AR is reloaded, i.e., until it becomes necessary to modify the allocation of the virtual address space with respect to the base field. Having considered the locality of the program that the area to which the program refers to is very small in view of a short period of time, the frequency of occurrences of the allocation change is very low. Consequently, even if the time for referring to the ALB is lengthened to some extent, the influence on the performance is small.

For the reasons mentioned above, in the embodiment of FIG. 1, the ALB is not in the form of hardware and is located in the local storage (LS) 18 which is readable and writable by the microprogram. This minimizes the quantity of hardware. Also it is possible to modify the ALB in construction and addressing with ease by modifying the microprogram.

For an alternative manner to obtain the same results, the ALB may be disposed in a dedicated field which is located in a main storage and is accessible from hardware only.

Figure 2:
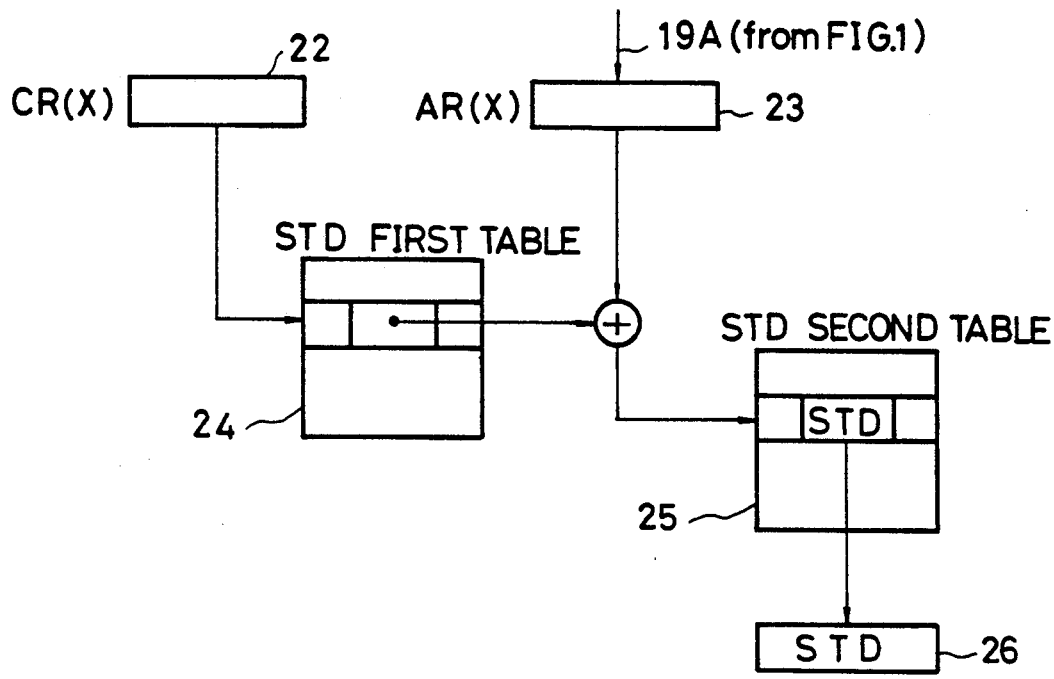
FIG. 2 is a block diagram showing the details of an AR translator 21 of FIG. 1.

FIG. 2 shows the details of the AR translator 21 in the embodiment of FIG. 1.

In FIG. 2, an address indicating the entry of an STD first table 24 is held in a control register 22. At this address; a leading address of data stored in an STD second table 25 is obtained. An address of the STD second table 25 is held in the AR 19 of FIG. 1, and the content of the AR indicated by the base field of the instruction is set in an AR data register 23 by the microprogram so that an STD second table entry address is obtained by adding the leading address of the STD second table with the content of the AR data register 23. The content stored in the STD second table 25 at this address is outputted and is stored, as the STD, in a register 26.

The STD first table 24 and the STD second table 25 are tables that are prepared and managed by the system program, defining virtual address spaces accessible by the program under execution.

Figure 3:
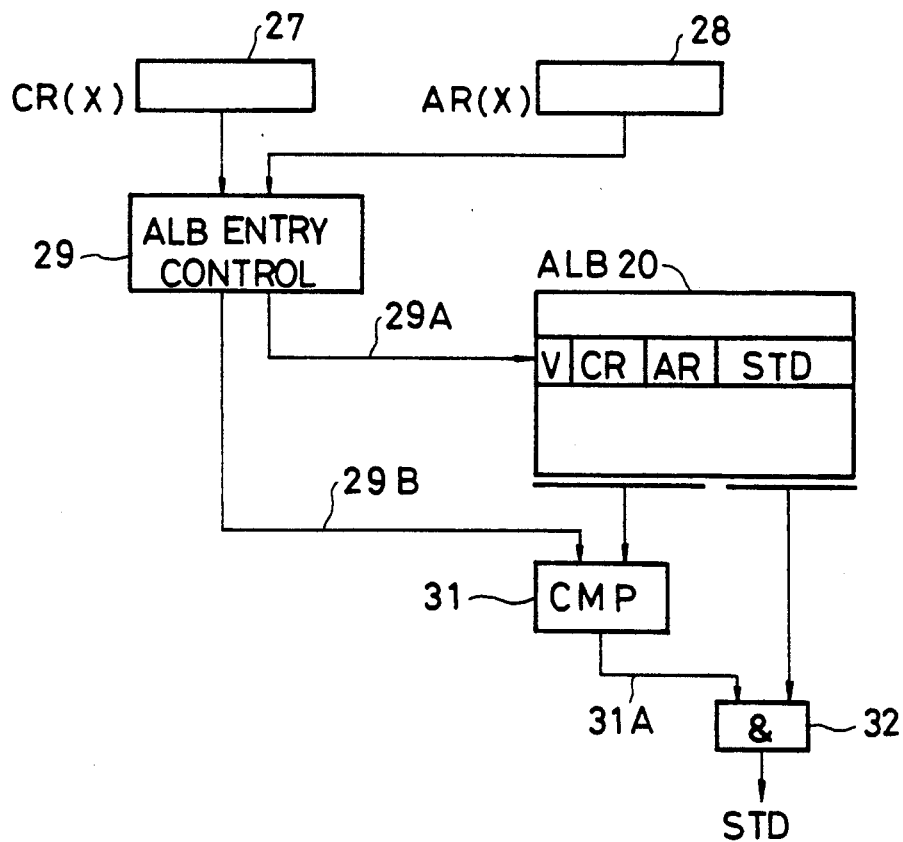
FIG. 3 is a block diagram showing the details of an AR translation buffer 20 of FIG. 1.

FIG. 3 shows the details of the ALB 20 in the embodiment of FIG. 1.

The entry of the ALB 20 comprises a V bit field indicating whether the entry is valid or not, a CR field for holding the content of the control register, namely, the data to be translated during the AR translation performed in the past, an AR field for holding the content of the AR, namely, also the data to be translated during the AR translation performed in the past, and an STD field for holding the STD, namely, the result of the AR translation. The microprogram adds the content of a control register 27 with the content of an AR data register 28, in which the content of the AR indicated by the base field is held, in an ALB entry control circuit 29 during the operand access, to prepare an ALB entry address 29A and an ALB comparing data 29B. Then the V, CR and AR fields of the ALB entry indicated by the ALB entry address are compared with the ALB comparing data by a comparator 31. If they agree with each other, namely, if the contents to the control register and the AR as the data to be translated during the current operand access agree with the CR and AR fields as the data held in ALB, a coincidence signal 31A is provided. Upon receipt of the coincidence signal 31A, an AND circuit 32 outputs the STD of the ALB entry.

In the ALB of the illustrated embodiment, the STD first table and the STD second table, which are mentioned above in connection with FIG. 2, are not held in the entry. This is because these tables are tables prepared and managed by the system program, and an ALB invalidating instruction is issued by the system program when the tables are modified. When the ALB invalidating instruction is thus issued, "0" is written in the V bit of every entry of the ALB by the microprogram to invalidate the ALB.

The AR translation and the construction of the ALB which are described in connection with FIGS. 2 and 3 are only an illustrative example. Either the AR translation or the construction of the ALB is not pertinent in this invention. The gist of the invention is to hold in the ASR the STD as the result of the AR translation, or preferably to hold the STD in the ASR and ALB of the two-step designation holding means, so that the STD is supplied quickly and efficiently. Therefore the description of the AR translation and the construction of the ALB is omitted here for clarity.

According to this invention, since there are provided two kinds of holding means, i.e. the designation holding means (ASR) for holding the segment table designations (STDs) corresponding to the access registers (ARs) and the translation buffer (ALB) for holding the translation pairs of the ARs and STDs, it is possible to quickly supply the STD designating the virtual address space possessing the operand, thus improving the processing performance.

Further, since with the designation holding means provided, the ALB can be provided in the local storage (LS) or a memory, such as the area dedicated to hardware in the main storage, without having the ALB in the form of hardware, it is possible to minimize the quantity of hardware, thus making the address control apparatus as well as the multiple virtual storage system inexpensive.

What is claimed is:

1. A multiple virtual storage system having an address translator and a plurality of access registers corresponding to a plurality of general registers in a processor, wherein said multiple virtual storage system when any one of the general registers is designated by an instruction being executed by said processor, a logical address of an operand of the instruction is obtained by using a content of the designated one of the general registers while designating a virtual address space possessing the operand by a segment table designation obtained by translating a content of an access register corresponding to the designated one of the general registers according to a predetermined rule with a table in a main storage and the segment table designation and the logical address are translated into a real address by said address translator, said multiple virtual storage system comprising:

(a) access register translating means for translating a content of the access register to obtain the segment table designation;

(b) designation holding means for holding a plurality of pairs of data each having a segment table designation obtained by said access register translating means and a valid bit indicating whether a respective segment table designation is valid or not, each pair of data corresponds to one of the general registers; and (c) means for, at the time of an operand access attendant on executing an instruction, reading the content of said designation holding means corresponding to the general register, in parallel with reading a general register for calculating an address of the operand, supplying the segment table designation, along with the logical address, to the address translator if the read segment table designation is valid and performing, if the read segment table designation is invalid, the translating of the access register while deterring the execution of the instruction so that the segment table designation obtained by the translating is stored in said designation holding means to restart executing an instruction.

2. A multiple virtual storage system having an address translator and a plurality of access registers corresponding to a plurality of general registers in a processor, wherein in said multiple virtual storage system when any one of the general registers and the respective one of the access registers are designated by an instruction being executed by a processor, a logical address of operand of the instruction is obtained by using a content of the designated one of the general registers while designating a virtual address space possessing the operand by a segment table designation obtained by translating a content of an access register according to a predetermined rule with a table in a main storage and the segment table designation and the logical address are translated into a real address by said address translator, said multiple virtual storage system comprising:

(a) access register translating means for translating the content of the access register to obtain the segment table designation;

(b) designation holding means for holding a plurality of pairs of data each having a segment table designation obtained by said access register translating means and a valid bit indicating whether a respective segment table designation is valid or not, each pair of data corresponds to one of the general registers, (c) a translation buffer for holding a plurality of translation pairs of data translated in the past through translating of the content of the access register and the translated result; and (d) means for, at the time of an operand access attendant on executing an instruction, reading a content of said designation holding means corresponding to the general register, in parallel with reading the general register for calculating an address of the operand, supplying the segment table designation, along with the logical address, to the address translator if the read segment table designation is valid, deterring the execution of the instruction if the read segment table designation is invalid, discriminating, with comparison between the translated data held by said translation buffer and the data to be translated at the current operand access, whether or not the access register translation was performed in the past on the data to be translated, restarting executing of the instruction, if the access register translation was performed, after storing in said designation holding means the segment table designation held by said buffer and supplying the segment table designation to the address translator, and performing, if the access register translation was not performed in the past, the access register translation so that the segment table designation obtained by the translating is stored in the designation holding means and said translation buffer to restart executing an instruction.

* * * * *